United States Patent
Takeda et al.

(10) Patent No.: US 12,469,625 B2
(45) Date of Patent: Nov. 11, 2025

(54) NON-ORIENTED ELECTRICAL STEEL SHEET

(71) Applicant: NIPPON STEEL CORPORATION, Tokyo (JP)

(72) Inventors: Kazutoshi Takeda, Tokyo (JP); Shuichi Yamazaki, Tokyo (JP); Takuya Matsumoto, Tokyo (JP); Hiroyasu Fujii, Tokyo (JP); Masaru Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 836 days.

(21) Appl. No.: 17/761,971

(22) PCT Filed: Sep. 18, 2020

(86) PCT No.: PCT/JP2020/035520
§ 371 (c)(1),
(2) Date: Mar. 18, 2022

(87) PCT Pub. No.: WO2021/054451
PCT Pub. Date: Mar. 25, 2021

(65) Prior Publication Data
US 2022/0336129 A1    Oct. 20, 2022

(30) Foreign Application Priority Data
Sep. 20, 2019    (JP) .................. 2019-171263

(51) Int. Cl.
*H01F 1/18*    (2006.01)
*B05D 1/02*    (2006.01)
(Continued)

(52) U.S. Cl.
CPC ................ *H01F 1/18* (2013.01); *B05D 1/02* (2013.01); *B05D 1/18* (2013.01); *C08K 3/32* (2013.01);
(Continued)

(58) Field of Classification Search
None
See application file for complete search history.

(56) References Cited

U.S. PATENT DOCUMENTS

| 5,945,212 A | 8/1999 | Tanaka et al. |
| 2017/0342568 A1 | 11/2017 | Yamazaki et al. |
| 2018/0033529 A1* | 2/2018 | Takeda ..................... H01F 3/00 |

FOREIGN PATENT DOCUMENTS

| EP | 3 263 741 A1 | 1/2018 |
| EP | 3 395 923 A1 | 10/2018 |

(Continued)

*Primary Examiner* — Xiaowei Su
(74) *Attorney, Agent, or Firm* — Birch, Stewart, Kolasch & Birch, LLP (57) ABSTRACT

There is provided a non-oriented electrical steel sheet that includes a base metal steel sheet and an insulating coating film that is formed on a surface of the base metal steel sheet, wherein the insulating coating film mainly contains metal phosphate, organic resin, and water-soluble organic compound, the metal phosphate contains at least aluminum as a metallic element, the organic resin has an SP value being within a range of 18.0 $(MPa)^{0.5}$ or more to less than 24.0 $(MPa)^{0.5}$, the water-soluble organic compound has an SP value being within a range of 19.0 $(MPa)^{0.5}$ or more to less than 35.0 $(MPa)^{0.5}$, and when measurement by X-ray diffractometry is performed on the insulating coating film, a degree of crystallinity of aluminum phosphate calculated from a peak from the metal phosphate is within a range of 0.5 to 5.0%.

6 Claims, 2 Drawing Sheets

(51) Int. Cl.
*B05D 1/18* (2006.01)
*C08K 3/32* (2006.01)
*C09D 7/61* (2018.01)
*C09D 133/08* (2006.01)
*C21D 8/12* (2006.01)

(52) U.S. Cl.
CPC ............ C09D 7/61 (2018.01); C09D 133/08 (2013.01); *B05D 2202/10* (2013.01); *C08K 2003/327* (2013.01)

(56) References Cited

FOREIGN PATENT DOCUMENTS

| | | |
|---|---:|---|
| JP | 6-330338 A | 11/1994 |
| JP | 11-80971 A | 3/1999 |
| JP | 11-152579 A | 6/1999 |
| JP | 2003-193251 A | 7/2003 |
| JP | 2017-141480 A | 8/2017 |

* cited by examiner

NON-ORIENTED ELECTRICAL STEEL SHEET

TECHNICAL FIELD

The present invention relates to a non-oriented electrical steel sheet.

BACKGROUND ART

Surfaces of non-oriented electrical steel sheets are typically provided with insulating coating films. In addition to insulation property, various coating properties are required for insulating coating films such as corrosion resistance, adhesiveness, heat resistance for resisting annealing, and stability as coatings. In conventional practices, insulating coating films are blended with a chromate, and thereby the coating properties are provided at an extremely high level. However, amid growing awareness of environmental issues, insulating coating films without chromates have recently been developed.

For example, Patent Documents 1 and 2 disclose a non-oriented electrical steel sheet including an insulating coating film that mainly contains an organic resin and a metal phosphate of one type selected from specific metal elements. Patent Document 3 discloses a surface treatment agent for a non-oriented electrical steel sheet, the surface treatment agent containing phosphorus acid aluminum, organic resin, and OH-containing organic compound that are blended together in a specific ratio. In addition, Patent Document 4 discloses a method for producing an electrical steel sheet with an insulating coating film, the method including performing phosphoric acid pickling treatment and drying treatment and then forming a phosphate compound coating on a surface of a steel sheet, in which the drying treatment is performed based on a predetermined relation between temperature and drying time.

LIST OF PRIOR ART DOCUMENTS

Patent Document

Patent Document 1: JP6-330338A
Patent Document 2: JP11-80971A
Patent Document 3: JP11-152579A
Patent Document 4: JP2003-193251A

SUMMARY OF INVENTION

Technical Problem

However, in the case where an insulating coating film not containing a chromate as disclosed in Patent Documents 1 to 3 is used, the insulating coating film has improved punchability (i.e., workability) while exerting an excellent insulation property but is still susceptible to improvement for providing an insulating coating film that further combines adhesiveness, hygroscopic resistance, corrosion resistance, and heat resistance.

In addition, the technique disclosed in Patent Document 4 provides excellent appearance and adhesiveness but involves a problem of industrial productivity because the technique requires pickling treatment with phosphorus acid to be performed in advance and requires the drying treatment to be performed after the pickling treatment.

An objective of the present invention, which has been made in view of such a problem, is to provide a non-oriented electrical steel sheet including an insulating coating film that is excellent in insulation property, workability, adhesiveness, hygroscopic resistance, corrosion resistance, and heat resistance without containing a chromate.

Solution To Problem

The present invention has been made to solve the above problem, and the gist thereof is a non-oriented electrical steel sheet to be described below.

(1) A non-oriented electrical steel sheet including
a base metal steel sheet and an insulating coating film that is formed on a surface of the base metal steel sheet, wherein
the insulating coating film contains metal phosphate, organic resin, and water-soluble organic compound at 50 mass % or more in total with respect to a total mass of the insulating coating film,
the metal phosphate contains at least aluminum as a metallic element,
the organic resin has an SP value that is within a range of 18.0 $(MPa)^{0.5}$ or more to less than 24.0 $(MPa)^{0.5}$,
the water-soluble organic compound has an SP value that is within a range of 19.0 $(MPa)^{0.5}$ or more to less than 35.0 $(MPa)^{0.5}$, and
when measurement by X-ray diffractometry is performed on the insulating coating film, a degree of crystallinity of aluminum phosphate calculated from a peak from the metal phosphate is within a range of 0.5 to 5.0%.

(2) The non-oriented electrical steel sheet according to (1) above, wherein the metal phosphate further contains a divalent metallic element M other than aluminum as a metallic element.

(3) The non-oriented electrical steel sheet according to (2) above, wherein the metallic element M is one or more types selected from the group consisting of Zn, Co, Mg, Mn, and Ni.

(4) The non-oriented electrical steel sheet according to any one of (1) to (3) above, wherein a content of the organic resin is, per 100 parts by weight of the metal phosphate, 3 parts by weight or more to 50 parts by weight or less.

Advantageous Effect of Invention

According to the present invention, it is possible to obtain a non-oriented electrical steel sheet including an insulating coating film that is excellent in insulation property, workability, adhesiveness, hygroscopic resistance, corrosion resistance, and heat resistance without containing a chromate.

DESCRIPTION OF EMBODIMENTS

The present inventors conducted intensive studies about a method for providing an insulating coating film that combines insulation property, workability, adhesiveness, hygroscopic resistance, corrosion resistance, and heat resistance and consequently came to obtain the following findings.

(a) By making the insulating coating film contain at least phosphate of aluminum as a metal phosphate and by forming a close-grained insulating coating film, it becomes possible to provide insulation property, punchability, adhesiveness, hygroscopic resistance, corrosion resistance, and heat resistance.

(b) To provide the close-grained insulating coating film, it is necessary to render crystals of aluminum phosphate in a polycrystal in a fine state. To this end, it is important to decrease a degree of crystallinity of aluminum phosphate.

(c) On the other hand, if most of aluminum phosphates are in an amorphous state, excessive reaction of the aluminum phosphates with moisture in the air will occur, degreasing hygroscopic resistance.

(d) From the viewpoints described above, the degree of crystallinity of the aluminum phosphate is to be controlled to be within a range of 0.5 to 5.0%.

(e) To control the degree of crystallinity of aluminum phosphate within the range, it is necessary to control a composition and contents of an organic resin and a water-soluble organic compound that are to be contained together with a metal phosphate in surface treatment agent and to control a condition for heating performed after the surface treatment agent is applied, in a combined manner.

The present invention has been made based on the findings described above. Requirements of the present invention will be described below.

1. General Configuration of Non-Oriented Electrical Steel Sheet

Figure 1:
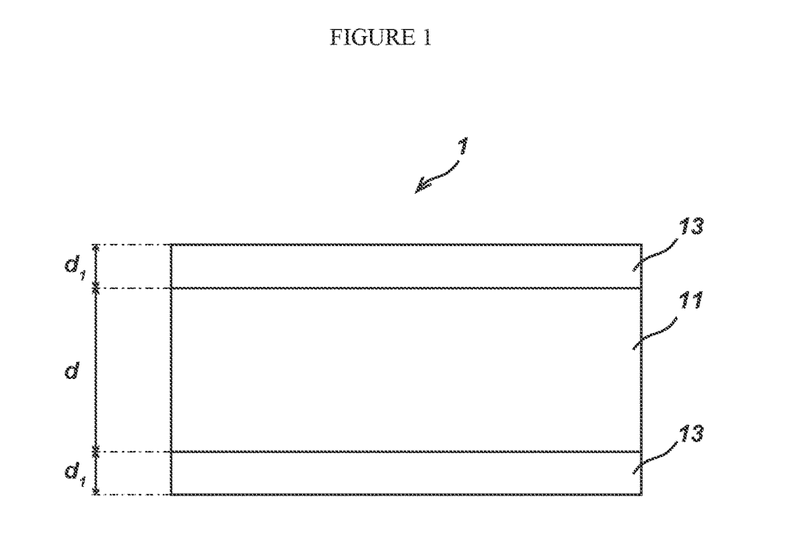
FIG. 1 is a schematic diagram for describing a structure of a non-oriented electrical steel sheet according to an embodiment of the present invention.

FIG. 1 is a schematic diagram for describing a structure of a non-oriented electrical steel sheet according to the present embodiment. A non-oriented electrical steel sheet 1 includes a base metal steel sheet 11 and insulating coating films 13 that are formed on surfaces of the base metal steel sheet 11. Although the insulating coating films 13 are provided on the surfaces on both sides of the base metal steel sheet 11 in a thickness direction of the base metal steel sheet 11 in FIG. 1, an insulating coating film 13 may be provided on only a surface of one side of the base metal steel sheet 11.

2. Base Metal Steel Sheet

There is no particular limitation on a steel type of the base metal steel sheet 11 used for the non-oriented electrical steel sheet 1. For example, it is preferable to use a non-oriented electrical steel sheet having a chemical composition that contains, in mass %, Si: 0.1% or more and Al: 0.05% or more, with the balance being Fe and impurities.

Si (silicon) is an element that increases electric resistance and improves magnetic properties when its content is 0.1 mass % or more. As the content of Si increases, the magnetic properties are improved, but at the same time, brittleness tends to increase with an increase in the electric resistance. The increase in brittleness becomes prominent when the content of Si becomes more than 4.0 mass %, and the content of Si is thus preferably 4.0 mass % or less.

As with Si, Al (aluminum) is an element that increases electric resistance and improves magnetic properties when its content is 0.05 mass % or more. As the content of Al increases, the magnetic properties are improved, but at the same time, rolling properties tend to decrease with an increase in the electric resistance. The decrease in rolling properties becomes prominent when the content of Al becomes more than 3.0 mass %, and the content of Al is thus preferably 3.0 mass % or less.

As long as a non-oriented electrical steel sheet has the content of Si and the content of Al described above, there is no particular limitation on the non-oriented electrical steel sheet, and various types of known non-oriented electrical steel sheets can be used as the base metal steel sheet 11.

In addition to Si and Al described above, Mn (manganese) can be contained in the base metal steel sheet 11 within the range of 0.01 to 3.0 mass % in lieu of a part of Fe in the balance. In addition, in the base metal steel sheet according to the present embodiment, contents of other elements such as S (sulfur), N, (nitrogen), and C (carbon) are preferably less than 100 ppm in total, more preferably less than 30 ppm.

In the present embodiment, an ingot (e.g., slab) having the chemical composition is subjected to hot rolling and coiled into a coil as a hot-rolled sheet, annealed within the temperature range of 800 to 1050° C. as being in a state of the hot-rolled sheet when necessary, then subjected to cold rolling to have a thickness of 0.15 to 0.50 mm, and further annealed to be produced into a base metal steel sheet, which is preferably used as the base metal steel sheet 11. A sheet thickness of the base metal steel sheet 11 is more preferably 0.25 mm or less. In addition, in the annealing after the cold rolling, its annealing temperature is preferably within the range of 750 to 1000° C.

Furthermore, the base metal steel sheet 11 preferably has a relatively small surface roughness because a small surface roughness gives favorable magnetic properties. Specifically, arithmetic average roughnesses (Ra) in a rolling direction and a direction perpendicular to the rolling direction are both preferably 1.0 μm or less, more preferably 0.1 to 0.5 μm. This is because Ra being more than 1.0 μm tends to cause deterioration in the magnetic properties.

3. Insulating Coating Film

The insulating coating film 13 is formed at least on the surface on one side of the base metal steel sheet 11. The insulating coating film is an insulating coating film that mainly contains a metal phosphate, an organic resin, and a water-soluble organic compound to be described below in detail and does not contain chromium. Specifically, the insulating coating film contains the metal phosphate, the organic resin, and the water-soluble organic compound at 50 mass % or more in total with respect to the total mass of the insulating coating film. Each component will be described below in detail.

3-1. Metal Phosphate

The metal phosphate contained in the insulating coating film becomes solid content when a solution (e.g., aqueous solution, etc.) mainly containing a phosphoric acid and metal ions is dried and functions as a binder in the insulating coating film. There is no particular limitation on the type of the phosphoric acid, and various types of known phosphoric acids can be used; for example, orthophosphoric acid, metaphosphatic acid, polyphosphoric acid, or the like is preferably used. The solution of the metal phosphate can be prepared by mixing at least any one of oxides, carbonates, and hydroxides of metal ions into one of the various types of the phosphoric acids.

The metal phosphate contains Al (aluminum) as a metallic element. In other words, the insulating coating film contains a metal phosphate of Al (i.e., aluminum phosphate). There is no particular limitation on the content of the aluminum phosphate; however, the content of the aluminum phosphate is preferably 10 parts by weight or more per 100 parts by weight of the metal phosphate.

In addition, when measurement by X-ray diffractometry is performed on the insulating coating film of the non-oriented electrical steel sheet according to the present invention, a degree of crystallinity of the aluminum phosphate calculated from peaks from the metal phosphate is within a range of 0.5 to 5.0%. Here, the degree of crystallinity is an index that takes 100% when the aluminum phosphate is all crystallized and takes 0% when the aluminum phosphate is all amorphous. The degree of crystallinity of the aluminum phosphate in the insulating coating film according to the present embodiment being within the range of 0.5 to 5.0% means that the aluminum phosphate is little crystallized and is present in a state that the aluminum phosphate is almost amorphous.

If the degree of crystallinity of the aluminum phosphate is more than 5.0%, unevenness of a crystal face of the crystallized aluminum phosphate becomes prominent, resulting in a decrease in space factor or a decrease in adhesiveness and/or workability. However, if the degree of crystallinity of the aluminum phosphate is as excessively low as less than 0.5%, there is a surplus of bonds of the metal phosphate, which will bind to water to accelerate moisture absorption, resulting in a deterioration in hygroscopic resistance.

By controlling the degree of crystallinity of the aluminum phosphate to be within the range of 0.5 to 5.0%, crystals of the aluminum phosphate are rendered in a polycrystal in a fine state, making it possible to provide a close-grained insulating coating film. By providing a close-grained insulating coating film, insulation property, punchability, adhesiveness, hygroscopic resistance, corrosion resistance, and heat resistance are provided. The degree of crystallinity of the aluminum phosphate is preferably 4.0% or less, more preferably less than 2.0%, still more preferably 1.0% or less.

The degree of crystallinity of the aluminum phosphate can be controlled to be within a desired range by introducing a factor that restrains growth of grains, into the insulating coating film. When the insulating coating film contains types of metal phosphate that are similar to one another, crystallization of the metal phosphate is often restrained.

Therefore, the metal phosphate preferably further contains, in addition to Al, a divalent metallic element M other than aluminum. Such a divalent metallic element M can be one or more types selected from the group consisting of, for example, Zn, Co, Mg, Mn, and Ni.

When a metal phosphate having the metallic element M as described above is contained in addition to the aluminum phosphate, it is possible to keep crystallization areas of the aluminum phosphate in the insulating coating film small. As a result, it is possible to further drive the polycrystallization of the aluminum phosphate, further densifying the insulating coating film. In the insulating coating film according to the present embodiment, the metal phosphate more preferably contains aluminum and zinc as metallic elements (in other words, more preferably contains aluminum phosphate and zinc phosphate).

Figure 2:
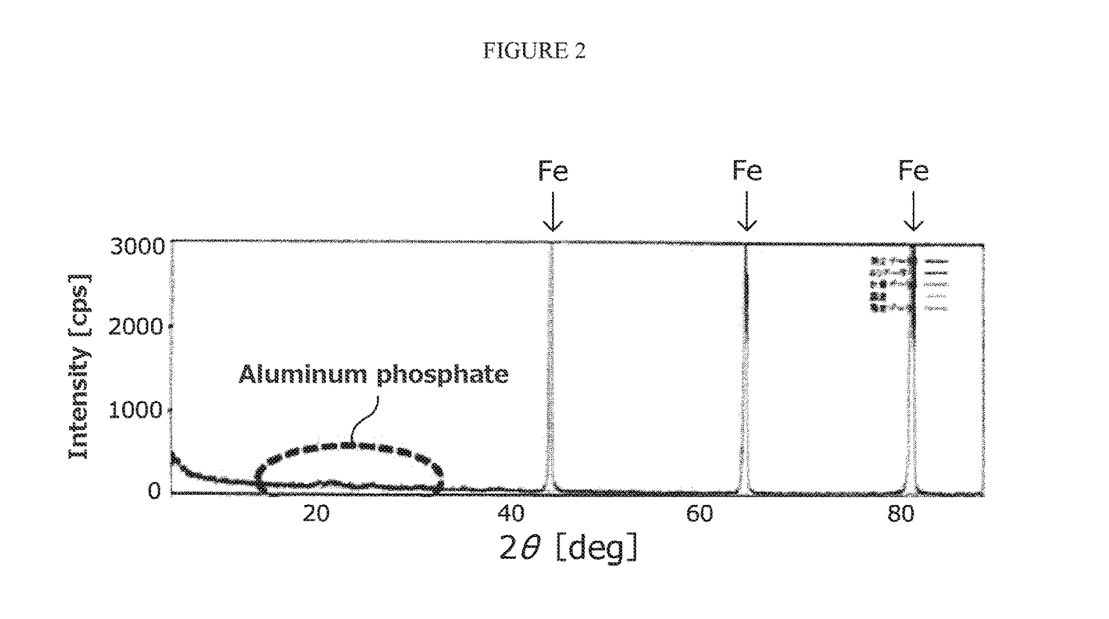
FIG. 2 illustrates an example of an XRD spectrum of the non-oriented electrical steel sheet.

Next, how to determine the degree of crystallinity of the aluminum phosphate will be described specifically with reference to FIG. 2 and FIG. 3. FIG. 2 illustrates an example of an XRD spectrum of the non-oriented electrical steel sheet according to the present embodiment, and FIG. 3 is a schematic diagram for describing a degree of crystallinity of an insulating coating film.

FIG. 2 illustrates an XRD spectrum of a non-oriented electrical steel sheet that includes aluminum phosphate, an example of the metal phosphate, in a form of an insulating coating film. As illustrated in FIG. 2, when an XRD spectrum of the non-oriented electrical steel sheet including aluminum phosphate is measured, three strong peaks from Fe in a base metal steel sheet are observed in vicinities of $2\theta=40$ degrees, 60 degrees, and 80 degrees, and weak peaks from the aluminum phosphate are observed in a vicinity of $2\theta=20$ degrees. An XRD peak of a metal phosphate differs depending on a metallic element included in the metal phosphate. An XRD peak of the metal phosphate in question in the present embodiment is observed at a vicinity of the following angle, for example.

Aluminum Phosphate: ($2\theta$) in a Vicinity of 21.59 Degrees

Figure 3:
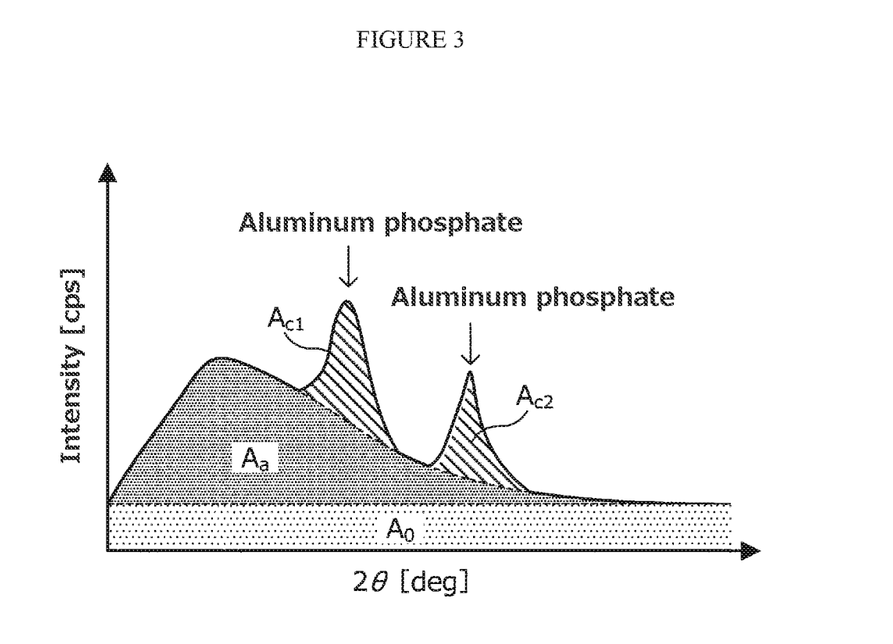
FIG. 3 is a schematic diagram for describing a degree of crystallinity of an insulating coating film.

Under magnification, the peaks from the aluminum phosphate are as schematically illustrated in FIG. 3. The peaks of the aluminum phosphate include a background attributable to diffraction by the air and the like (a part corresponding to an integrated intensity $A_0$ in FIG. 3), a broad peak attributable to the metal phosphate in an amorphous state (a part corresponding to an integrated intensity $A_a$ in FIG. 3), and peaks attributable to the aluminum phosphate in a crystalline state (parts corresponding to integrated intensities $A_{c1}+A_{c2}$ in FIG. 3).

Although there are two peaks attributable to the aluminum phosphate illustrated in the schematic diagram for simplicity, there are actually many peaks attributable to the aluminum phosphate. Of the many peaks, only peaks of sufficiently high strengths are to be extracted. That is, a degree of crystallinity Wc (%) of the aluminum phosphate can be calculated from Formula (101) below.

Expression 1

$$W_c = \frac{\sum_k A_{ci}}{A_a + \sum_k A_{ci}} \times 100 \quad (101)$$

Here, the XRD spectrum of the non-oriented electrical steel sheet can be obtained by performing measurement with a commercially available X-ray diffractometer, and there is no particular limitation on conditions for the measurement; however, for example, the XRD spectrum of the non-oriented electrical steel sheet can be obtained by performing the measurement under the following measurement conditions. That is, the measurement is performed with the apparatus SmartLab from Rigaku Corporation, under conditions of using Cu tube, a voltage of 40 kV, a current of 30 mA, a measurement angle ($2\theta$) 5 to 90°, a step of 0.02°, a scanning mode of 4°/min, and an entrance slit of ½ deg.

3-2. Organic Resin

The organic resin contained in the insulating coating film is present in a state of being dispersed in the metal phosphate functioning as a binder. The presence of the organic resin in the metal phosphate makes it possible to restrain grains of the metal phosphate from growing to be large and accelerate the poly crystallization of the metal phosphate, enabling the formation of a close-grained insulating coating film.

In order to sufficiently exert the effect of restraining growth of aluminum phosphate grains, the organic resin is to have an SP value that is within a range of 18.0 $(MPa)^{0.5}$ or more to less than 24.0 $(MPa)^{0.5}$. Although depending on baking conditions, if the SP value of the organic resin is excessively low, the organic resin becomes likely to be separated from the metal phosphate in general; as a result, the metal phosphate becomes likely to be crystallized, and the degree of crystallinity of the aluminum phosphate tends to increase. In contrast, if the SP value of the organic resin is excessively high, the organic resin becomes likely to be mixed with the metal phosphate, which significantly hampers the metal phosphate from being crystallized, and the degree of crystallinity of the aluminum phosphate tends to decrease to excess.

The SP value of the organic resin is more preferably within a range of 19.0 $(MPa)^{0.5}$ or more to less than 23.5 $(MPa)^{0.5}$, still more preferably within a range of 20.0 $(MPa)^{0.5}$ or more to less than 23.0 $(MPa)^{0.5}$.

Here, the SP value is what is called a solubility parameter. The solubility parameter adopted in the present invention is a thermodynamic physical quantity that represents a scale for compatibility between substances, and it is known that substances having similar SP values tend to dissolve in each other. In addition, the solubility parameter adopted in the present invention is called Hildebrand solubility parameter, which is generally measured by the cloud method.

In the cloud method, an organic resin is dissolved in advance in one solvent with a known SP value that causes the organic resin to be dissolved well therein, then, another solvent with an SP value that is known but different from that of the one solvent is gradually dropped, and an SP value of the organic resin is calculated from the SP values of the solvents and amounts of the solvents required to cause the organic resin to precipitate to cloud the solution.

There is no particular limitation on the type of the organic resin as long as its SP value is within the range described above, and one, or two or more types of various known organic resins such as acrylic resin, polystyrene resin, vinyl acetate resin, epoxy resin, polyurethane resin, polyamide resin, phenolic resin, melamine resin, silicon resin, polypropylene resin and polyethylene resin, can be used.

Among others, it is preferable to use acrylic resin. More specifically, the acrylic resin is obtained by copolymerizing (more specifically, emulsion polymerization of) monomer or oligomer of the acrylic resin in the present of nonionic surfactant in which molecules each have a radically polymerizable unsaturated group (which can be regarded as reactive surfactant). In the present embodiment, for example, a dispersion liquid (emulsion) obtained by dispersing the resulting acrylic copolymer in a dispersion medium such as water is used.

As the nonionic surfactant, for example, one of surfactants having a radically polymerizable unsaturated group such as (meth)allyl group, (meth) acrylic group, a styryl group and having the number of moles added of an alkylene oxide being within a range of 20 to 55 can be used, or two or more of the surfactants can be used in combination. By using such an acrylic resin as the organic resin, it is possible to accelerate polycrystallization of the metal phosphate more reliably, making it possible to provide a more close-grained insulating coating film.

Examples of available monomers for the copolymerization of the acrylic resin used in the present embodiment include, but not particularly limited to, methyl acrylate, ethyl acrylate, n-butyl acrylate, i-butyl acrylate, n-octyl acrylate, i-octyl acrylate, 2-ethylhexyl acrylate, n-nonyl acrylate, n-decyl acrylate, and n-dodecyl acrylate. In addition, acrylic acid, methacrylic acid, maleic acid, maleic anhydride, fumaric acid, crotonic acid, itaconic acid, and the like can be used as monomers with a functional group, and 2-hydroxylethyl(meth)acrylate, 2-hydroxylpropyl(meth) acrylate, 3-hydroxylbutyl(meth)acrylate, 2-hydroxylethyl(meth)allylether, and the like can be used as monomers with a hydroxyl group.

The acrylic resin according to the present embodiment can be formulated such that its SP value falls within a prescribed range by performing an emulsion polymerization process using the nonionic surfactant or combining various monomers.

3-3. Water-Soluble Organic Compound

The water-soluble organic compound contained in the insulating coating film is an organic compound that is water-soluble and compatible with an inorganic solution of a metal phosphate or the like, such as alcohol, ester, ketone, ether, carboxylic acid, and sugar. By blending the water-soluble organic compound into treatment liquid containing the metal phosphate and the organic resin, the water-soluble organic compound is contained in inorganic components of the metal phosphate and the like when the treatment liquid is applied to the surface of the steel sheet and dried. Note that, in the present embodiment, being water-soluble means properties of being dissolved in water unlimitedly or partially.

The water-soluble organic compound used in the present embodiment is a water-soluble organic compound having an SP value that is within a range of 19.0 $(MPa)^{0.5}$ or more to less than 35.0 $(MPa)^{0.5}$. Although depending on baking conditions, if the SP value of the water-soluble organic compound is excessively high, a stability of a metal ion in the metal phosphate increases in general; as a result, the metal phosphate becomes likely to be crystallized, and the degree of crystallinity of the aluminum phosphate tends to increase. In contrast, if the SP value of the water-soluble organic compound is excessively low, the stability of the metal phosphate decreases, which significantly hampers the metal phosphate from being crystallized, and the degree of crystallinity of the aluminum phosphate tends to decrease to excess.

The SP value of the water-soluble organic compound is more preferably within a range of 20.0 $(MPa)^{0.5}$ or more to less than 34.5 $(MPa)^{0.5}$, still more preferably within a range of 24.0 $(MPa)^{0.5}$ or more to less than 34.0 $(MPa)^{0.5}$.

As specific examples of the water-soluble organic compound according to the present embodiment, ethyl diglycol acetate, n-butanol, ethyl acetate, propylene glycol monomethyl ether acetate, ethylcellosolve, ethylene glycol monophenyl ether, pentanediol, isopropanol, 1,3-pentanediol, allyl alcohol, acetonitrile, 1-propanol, tetrahydro-2,4-dimethylthiophene 1,1-dioxide, diethylene glycol, dimethylformamide, ethylacetamide, ethylenediamine, diethyl sulfone, dimethylphosphite, phenylhydrazine, 2-methoxyethanol, butyrolactone, propylene glycol, ε-caprolactam, ethanol, 3-methylsulfolane, N-nitrosodimethylamine, propiolactone, tetramethylene sulfone, methyl ethyl sulfone, 2-piperidone, phenol, dimethyl sulfoxide, methanol, ethylene glycol, methylacetamide, 2-pyrrolidine, ethylene cyanohydrin, NN-dimethylformamide, glycerin, and the like can be used.

Among others, as the water-soluble organic compound according to the present embodiment, isopropanol, acetonitrile, diethylene glycol, ethylenediamine, 2-methoxyethanol, propylene glycol, ethanol, methanol, ethylene glycol, NN-dimethylformamide, glycerin, and the like are suitable.

The water-soluble organic compound remains in the coating after coating and baking. At this time, even if the boiling point or the sublimation point of the water-soluble organic compound is lower than the boiling point of water, the water-soluble organic compound remains in the coating after the coating and baking since the water-soluble organic compound and the metal phosphate interact with each other. In addition, in actual operation, a time taken to dry and bake the coating is about several seconds, and thus, also from this viewpoint, the water-soluble organic compound is to remain in the coating.

However, to cause the water-soluble organic compound to remain in the coating after the coating and baking more reliably, the boiling point of the water-soluble organic compound is preferably higher than the boiling point of water in the case where the water-soluble organic compound is liquid, and the sublimation point of the water-soluble organic compound is preferably higher than the boiling point of water in the case where the water-soluble organic compound is solid. More favorably, the boiling point or the sublimation point of the water-soluble organic compound according to the present embodiment is preferably 150° C. or more, more preferably 200° C. or more. By using a water-soluble organic compound having the boiling point or the sublimation point of 150° C. or more, it is possible to restrain the residual ratio of the water-soluble organic compound in the coating from decreasing to make an effect of adding the water-soluble organic compound exert more reliably. On the other hand, the boiling point or the sublimation point of the water-soluble organic compound according to the present embodiment is preferably less than 300° C. If the boiling point or the sublimation point of the water-soluble organic compound is 300° C. or more, the water-soluble organic compound can cause surface tackiness and deliquescence.

4. Coating Thickness of Insulating Coating Film

The thickness of the insulating coating film is preferably about 0.3 to 5.0 µm, more preferably about 0.5 µm to 2.0 µm. By specifying the coating thickness of the insulating coating film within the range, it is possible to keep more excellent uniformity.

5. Production Method for Non-Oriented Electrical Steel Sheet

A production method for the non-oriented electrical steel sheet according to the present embodiment is a production method for producing a non-oriented electrical steel sheet that includes a base metal steel sheet and an insulating coating film. The production method according to the present embodiment includes a step of applying the surface treatment agent described above to the surface of the base metal steel sheet and a step of heating the base metal steel sheet with the surface treatment agent applied thereto to form the insulating coating film. The steps will be each described below.

5-1. Step of Applying Surface Treatment Agent

In the application step, a surface treatment agent that includes 3 to 50 parts by weight of an organic resin and 5 to 50 parts by weight of a water-soluble organic compound per 100 parts by weight of a metal phosphate including at least aluminum and in which a solvent is water is applied to a surface of the base metal steel sheet. A blending proportion of the metal phosphate, the organic resin, and the water-soluble organic compound in the surface treatment agent is to be a blending proportion of the metal phosphate, the organic resin, and the water-soluble organic compound in the insulating coating film after the application and drying.

Here, as the metal phosphate, the organic resin, and the water-soluble organic compound in the surface treatment agent, the metal phosphate, the organic resin, and the water-soluble organic compound that are mentioned above to be used.

The content of the organic resin contained in the surface treatment agent is set to be 3 to 50 parts by weight per 100 parts by weight of the metal phosphate. By setting the content of the organic resin to be 3 parts by weight or more, it is possible to control the degree of crystallinity of the aluminum phosphate to be 5.0% or less. In addition, by setting the content of the organic resin to be 50 parts by weight or less, it is possible to control the degree of crystallinity of the aluminum phosphate to be 0.5% or more. In addition, by setting the content of the organic resin to be 50 parts by weight or less, it is possible to increase the concentration of the metal phosphate in a relative manner and ensure a heat resistance.

The content of the organic resin is, per 100 parts by weight of the metal phosphate, preferably 5 parts by weight or more, more preferably 6 parts by weight or more. In addition, the content of the organic resin is, per 100 parts by weight of the metal phosphate, preferably 40 parts by weight or less, more preferably 25 parts by weight or less.

In addition, the content of the water-soluble organic compound contained in the surface treatment agent is set to be 5 to 50 parts by weight per 100 parts by weight of the metal phosphate. By setting the content of the water-soluble organic compound to be 5 parts by weight or more, it is possible to control the degree of crystallinity of the aluminum phosphate to be 5.0% or less. In addition, by setting the content of the water-soluble organic compound to be 50 parts by weight or less, it is possible to control the degree of crystallinity of the aluminum phosphate to be 0.5% or more.

In addition, by setting the content of the water-soluble organic compound to be 5 parts by weight or more, punchability is also improved. Moreover, by setting the content of the water-soluble organic compound to be 50 parts by weight or less, it is possible to restrain the insulating coating film from becoming sticky or cloudy, so that a shiny coating surface can be obtained. The content of the water-soluble organic compound is, per 100 parts by weight of the metal phosphate, preferably 6 parts by weight or more, more preferably 7 parts by weight or more. In addition, the content of the water-soluble organic compound is, per 100 parts by weight of the metal phosphate, preferably 40 parts by weight or less, more preferably 25 parts by weight or less.

The surface treatment agent may further contain a nonionic surfactant. At this time, the content of the nonionic surfactant is preferably 0.1 to 10 parts by weight per 100 parts by weight of the metal phosphate. By setting the content of the nonionic surfactant to be 0.1 parts by weight or more, it is possible to further stabilize the treatment liquid. Thus, in a case where the nonionic surfactant is to be contained, the content of the nonionic surfactant is, per 100 parts by weight of the metal phosphate, more preferably 0.3 parts by weight or more, still more preferably 0.5 parts by weight or more. At the same time, by setting the content of the nonionic surfactant to be 10 parts by weight or less, it is also possible to prevent deterioration in corrosion resistance. Thus, in a case where the nonionic surfactant is to be contained, the content of the nonionic surfactant is, per 100 parts by weight of the metal phosphate, more preferably 5 parts by weight or less, still more preferably 3 parts by weight or less.

In the present embodiment, in addition to the components described above, for example, an inorganic compound such as carbonate, hydroxide, oxide, titanate, and tungstate or antifoaming agent, viscosity regulator, antiseptic, leveling agent, brightener, or the like may be contained.

In addition, for the emulsion polymerization, for example, various kinds of polymerization initiators including persulfates such as sodium persulfate, potassium persulfate, ammonium persulfate, organic peroxides such as t-butylhydroperoxide, cumene hydroperoxide, and p-menthane hydroperoxide, and hydrogen peroxide, and the like can be used. One of these polymerization initiators can be used, or a plurality of types of these polymerization initiators can be used in combination. These polymerization initiators are preferably used in an amount of about 0.1 to 1 parts by weight per 100 parts by weight of monomer.

The surface treatment agent including the components described above is applied to the surface of the base metal steel sheet by various known application systems. Here, there is no particular limitation on the application system to be used; a roll coater system may be used, or an application system such as a spraying system and a dipping system may be used.

5-2. Step of Forming Insulating Coating Film

In the step of forming an insulating coating film, the base metal steel sheet to which the surface treatment agent has been applied is heated to a predetermined heating temperature to form the insulating coating film. The degree of crystallinity of the aluminum phosphate significantly depends on heating conditions. It is thus necessary to optimize the heating conditions based on a composition of the surface treatment agent.

The degree of crystallinity of the aluminum phosphate can be decreased by passing through a predetermined temperature range in which crystals of the metal phosphate start to precipitate in a short time when the surface treatment agent applied to the surface of the base metal steel sheet is dried and solidified. Thus, the heating is performed particularly such that a heating rate for a range of 100 to 200° C. falls within a range of 10 to 100° C./sec.

The degree of crystallinity tends to decrease with a decrease in the heating temperature, and the degree of crystallinity tends to increase with an increase in the heating temperature. For this reason, the heating temperature is to be set at 200° C. to 360° C. In addition, by setting the heating temperature at 200° C. or more, the polymerization reaction of the metal phosphate proceeds efficiently, making it easy to provide water resistance and the like. At the same time, by setting the heating temperature at 360° C. or less, it is possible to restrain the organic resin from being oxidized and to improve productivity. There is no particular limitation on the temperature at the start of the heating, and the temperature may be a temperature near a room temperature.

Furthermore, by decreasing a retention time at the heating temperature described above, it is possible to decrease the degree of crystallinity of the aluminum phosphate. The retention time at the heating temperature is thus set at 20 seconds or less. Note that, in a case where the metal phosphate does not contain the divalent metallic element M other than Al, the retention time at the heating temperature is set at less than 10 seconds because it is difficult to restrain the crystallization.

A cooling rate is set to be within a range of 10 to 50° C./sec from the heating temperature to 100° C. By setting the cooling rate to be 10° C./sec or more, it becomes possible to control the degree of crystallinity of the aluminum phosphate to be 5.0% or less. In the case where the metal phosphate does not contain the divalent metallic element M other than Al, the cooling rate is set at 20° C./sec or more because it is difficult to restrain the crystallization. At the same time, by setting the cooling rate to be 50° C./sec or less, it becomes possible to control the degree of crystallinity of the aluminum phosphate to be 0.5% or more.

There is no particular limitation on a heating system for performing the heating; a typical radiant heater or air-heating furnace is available, and heating using electricity such as an induction heating system may be used.

The present invention will be described below more specifically with reference to examples, but the present invention is not limited to these examples.

EXAMPLE

In the present example, base metal steel sheets that included chemical components consisting of, in mass %, Si: 3.1%, Al: 0.6%, and Mn: 0.2%, with the balance being Fe and impurities, had a sheet thickness of 0.30 mm, and had an arithmetic average roughness Ra of 0.32 µm were used.

On the surfaces of the base metal steel sheets, treatment liquids having compositions shown in Table 1 were applied such that an amount of application is 1.0 g/m², and the base metal steel sheets were subjected to baking under the conditions shown in Table 2. Note that types and SP values of water-soluble organic compounds and organic resins shown in Table 1 are shown in Table 3 and Table 4. In Table 2, the heating rates each mean an average heating rate for from the 100° C. to 200° C., the retention times each mean a time of retention at the corresponding heating temperatures, and the cooling rates each mean an average cooling rate for from the heating temperatures to 100° C.

TABLE 1

| | Metal phosphate | | | Water-soluble organic compound | | Organic resin | |
|---|---|---|---|---|---|---|---|
| | Aluminum | Metallic element M | | | | | |
| No. | Blending amount (part by weight) | Element | Blending amount (part by weight) | Type | Blending amount (part by weight) | Type | Blending amount (part by weight) |
| 1 | 100 | — | | GL | 12 | Acrylic resin 1 | 15 |
| 2 | 77 | Zn | 23 | MHA | 8 | Acrylic resin 2 | 20 |
| 3 | 17 | Zn | 83 | EG | 20 | Acrylic resin 2 | 20 |
| 4 | 83 | Mg | 17 | EtOH | 10 | Acrylic resin 3 | 8 |
| 5 | 80 | Mn | 20 | IPA | 8 | Acrylic resin 3 | 8 |
| 6 | 83 | Co | 17 | GL | 12 | Acrylic resin 4 | 6 |

TABLE 1-continued

| | Metal phosphate | | | Water-soluble organic compound | | Organic resin | |
|---|---|---|---|---|---|---|---|
| | Aluminum | Metallic element M | | | | | |
| No. | Blending amount (part by weight) | Element | Blending amount (part by weight) | Type | Blending amount (part by weight) | Type | Blending amount (part by weight) |
| 7 | 76 | Ni | 24 | GL | 12 | Acrylic resin 4 | 6 |
| 8 | 100 | — | | EG | 6 | Acetate resin | 10 |
| 9 | 100 | — | | EG | 6 | Urethane resin | 10 |
| 10 | 76 | Ni | 24 | GL | 12 | Acrylic resin 4 | 6 |
| 11 | 100 | — | | EG | 8 | Styrene resin | 15 |
| 12 | 83 | Mg | 17 | EG | 8 | Acrylic resin 5 | 15 |
| 13 | 100 | — | | EG | 8 | Alkyd resin | 15 |
| 14 | 100 | — | | MIBK | 6 | Acrylic resin 2 | 20 |
| 15 | 83 | Mg | 17 | EA | 30 | Acrylic resin 2 | 20 |
| 16 | 83 | Zn | 17 | HA | 10 | Acrylic resin 2 | 10 |
| 17 | 100 | — | | EG | 3 | Acrylic resin 2 | 20 |
| 18 | 100 | — | | EG | 52 | Acrylic resin 2 | 20 |
| 19 | 100 | — | | IPA | 8 | Acrylic resin 1 | 2 |
| 20 | 100 | — | | IPA | 8 | Acrylic resin 1 | 55 |
| 21 | 0 | Co | 100 | MHA | 8 | Acrylic resin 4 | 6 |
| 21 | 0 | Mn | 100 | MHA | 8 | Acrylic resin 3 | 10 |
| 23 | 0 | Mg | 100 | MHA | 8 | Acrylic resin 3 | 10 |
| 24 | 0 | Ni | 100 | MHA | 8 | Acrylic resin 4 | 6 |
| 25 | 100 | — | | EiOH | 10 | Acrylic resin 2 | 22 |
| 26 | 17 | Zn | 83 | EG | 20 | Acrylic resin 2 | 20 |
| 27 | 100 | — | | EtOH | 10 | Acrylic resin 2 | 22 |
| 28 | 100 | — | | — | | Acrylic resin 1 | 15 |
| 29 | 100 | — | | IPA | 8 | Acrylic resin 3 | 8 |
| 30 | 17 | Zn | 83 | GL | 12 | Acrylic resin 4 | 6 |
| 31 | 100 | — | | IPA | 8 | Acrylic resin 3 | 8 |
| 32 | 80 | Mn | 20 | GL | 12 | Acrylic resin 4 | 6 |

TABLE 2

| No. | Heating rate (° C./s) | Heating temperature (° C.) | Retention time (s) | Cooling rate (° C./s) |
|---|---|---|---|---|
| 1 | 80 | 320 | 8 | 30 |
| 2 | 60 | 320 | 10 | 30 |
| 3 | 60 | 320 | 15 | 20 |
| 4 | 80 | 280 | 8 | 20 |
| 5 | 80 | 280 | 8 | 20 |
| 6 | 80 | 220 | 10 | 10 |
| 7 | 80 | 220 | 10 | 20 |
| 8 | 40 | 350 | 8 | 30 |
| 9 | 40 | 250 | 8 | 30 |
| 10 | 12 | 250 | 10 | 20 |
| 11 | 40 | 350 | 8 | 30 |
| 12 | 80 | 350 | 15 | 20 |
| 13 | 60 | 220 | 5 | 20 |
| 14 | 80 | 220 | 5 | 30 |
| 15 | 80 | 220 | 10 | 30 |
| 16 | 80 | 220 | 10 | 20 |
| 17 | 80 | 320 | 5 | 30 |
| 18 | 80 | 220 | 8 | 20 |
| 19 | 40 | 320 | 8 | 30 |
| 20 | 40 | 280 | 8 | 20 |
| 21 | 60 | 280 | 10 | 20 |
| 22 | 60 | 280 | 10 | 20 |
| 23 | 60 | 280 | 10 | 20 |
| 24 | 60 | 280 | 10 | 20 |
| 25 | 15 | 380 | 6 | 20 |
| 26 | 6 | 250 | 10 | 20 |
| 27 | 150 | 320 | 5 | 30 |
| 28 | 60 | 320 | 5 | 30 |
| 29 | 10 | 350 | 20 | 40 |
| 30 | 20 | 320 | 30 | 30 |
| 31 | 10 | 320 | 6 | 15 |
| 32 | 20 | 320 | 10 | 8 |

TABLE 3

| Symbol | Name of water-soluble organic compound | SP value $(MPa)^{0.5}$ |
|---|---|---|
| IPA | Isopropanol | 23.5 |
| EG | Ethylene glycol | 29.9 |
| GL | Glycerin | 33.8 |
| EtOH | Ethanol | 26.0 |
| MHA | N-methylformamide | 32.9 |
| MIBK | Methyl isobutyl ketene | 17.2 |
| EA | Ethyl acetate | 18.6 |
| HA | Formamide | 39.3 |

TABLE 4

| Name of organic resin | SP value $(MPa)^{0.5}$ |
|---|---|
| Acrylic resin 1 | 21.0 |
| Acrylic resin 2 | 23.2 |
| Acrylic resin 3 | 20.0 |
| Acetate resin | 19.8 |
| Urethane resin | 20.6 |
| Acrylic resin 4 | 19.0 |
| Acrylic resin 5 | 17.6 |
| Alkyd resin | 24.3 |
| Styrene resin | 17.0 |

As the metal phosphate, metal phosphate treatment liquids are prepared by mixing and stirring orthophosphoric acid, and hydroxides, oxides, and carbonates of metals such as $Al(OH)_3$, ZnO, and $Mg(OH)_2$, and the metal phosphate treatment liquids are made into their 40 mass % aqueous solutions. Note that the reagents used were all commercially available. Table 1 shows the blending amounts of aluminum phosphate in metal phosphates, and the blending amounts of other metal phosphates in the metal phosphates in terms of parts by weight.

The water-soluble organic compounds and the organic resins used are also commercially available and have SP values shown in Table 3 and Table 4.

The blending proportions of the metal phosphate, the water-soluble organic compound, and the organic resin in each of the treatment liquids shown in Table 1 are the blending proportions of the metal phosphate, the water-soluble organic compound, and the organic resin in each of the insulating coating films after the application and the drying.

Samples of the obtained non-oriented electrical steel sheets were subjected to the measurement by X-ray diffractometry, by which degrees of crystallinity of the aluminum phosphate were determined. Conditions for measuring the XRD spectrum were as mentioned above.

In addition, each sample was subjected to various evaluation tests. How to evaluate the produced samples will be described below in detail.

For adhesiveness, steel sheet samples with adhesive tapes attached thereto were wound around metal bars having diameters of 10 mm, 20 mm, and 30 mm, then the adhesive tapes were torn off, and the adhesiveness was evaluated from traces of the tearing. A sample that was not torn off even when the sample was bent around 10 mmϕ was given a grade "A", a sample that was not torn off when the sample was bent around 20 mmϕ was given a grade "B", a sample that was not torn off when the sample was bent around 30 mmϕ was given a grade "C", and a sample that was torn off was given a grade "D". For adhesiveness, samples that were given the grade "A" or "B" were rated as good.

For insulation property, based on a surface insulation resistance measured in conformity to the JIS (JIS C2550-4: 2019), a sample of a surface insulation resistance of less than 5 ω·cm$^2$/sheet was given a grade "D", a sample of a surface insulation resistance 5 ω·cm$^2$/sheet or more to less than 10 ω·cm$^2$/sheet was given a grade "C", a sample of a surface insulation resistance of 10 ω·cm$^2$/sheet or more to less than 50 ω·cm$^2$/sheet was given a grade "B", and a sample of a surface insulation resistance of 50 ω·cm$^2$/sheet or more was given a grade "A". For insulation property, samples that were given the grade "A" or "B" were rated as good.

Heat resistance was evaluated in terms of corrosion resistance after stress relieving annealing. The samples were subjected to heat treatment for 1 hour in a 100%-nitrogen atmosphere at 850° C. and subsequently left in a temperature and humidity controlled chamber at a temperature of 50° C. and a humidity of 90% for 48 hours, and an area fraction of rust occurred on the surface of each sample was evaluated as in the evaluation of corrosion resistance. Evaluation criteria are shown below; grades 9 and 10 were determined as "A", grades 6, 7, and 8 were determined as "B", grades 4 and 5 were determined as "C", grades 1, 2, and 3 were determined as "D", and samples given the grades "A" or "B" were rated as good.

For workability, the breaking load of each sample was measured and used as an index for workability. A cutting blade was set to come into contact perpendicularly with the sample worked into 3 cm×6 cm, and a load under which the sample was broken was measured. The breaking load was compared with a breaking load of a sample with no insulating coating film applied thereto; a ratio between the breaking loads being less than 0.95 was determined as "A", the ratio being 0.95 or more to less than 1.00 was determined as "B", the ratio being 1.00 or more to less than 1.05 was determined as "C", the ratio being 1.05 or more to less than 1.10 was determined as "D", and the ratio being 1.10 or more was determined as "E". Samples given the grades "A" or "B" for the workability were rated as good.

Corrosion resistance was evaluated in conformity to the salt spray test according to the JIS (JIS Z2371:2015). Specifically, each sample underwent 5 cycles each including a step of spraying 5%-NaCl aqueous solution in an atmosphere at 35° C. for 1 hour on the sample, a step of retaining the sample in an atmosphere at a temperature of 60° C. and a humidity of 40% for 3 hours, and a step of retaining the sample in an atmosphere at a temperature of 40° C. and a humidity of 95% for 3 hours, and then an area fraction of rust occurring on the surface of the sample was evaluated on a 10-point scale. Evaluation criteria are shown below. Samples given a grade of 5 or more for corrosion resistance were rated as good.

10: No rust occurring
9: Very small amount of rust occurring (area fraction being 0.10% or less)
8: Area fraction of rust occurring=more than 0.10% to 0.25% or less
7: Area fraction of rust occurring=more than 0.25% to 0.50% or less
6: Area fraction of rust occurring=more than 0.50% to 1.0% or less
5: Area fraction of rust occurring=more than 1.0% to 2.5% or less
4: Area fraction of rust occurring=more than 2.5% to 5.0% or less
3: Area fraction of rust occurring=more than 5.0% to 10% or less
2: Area fraction of rust occurring=more than 10% to 25% or less
1: Area fraction of rust occurring=more than 25% to 50% or less Hygroscopic resistance was evaluated by exposing the samples in a temperature and humidity controlled chamber in which a temperature is adjusted to 50° C., and a humidity is adjusted to 90%, for 720 hours, and then area fractions of rust occurring on their surfaces were determined by visual check. Evaluation criteria are shown below. Samples given a grade of 3 or more for hygroscopic resistance were rated as good.

5: No rust occurring or very small amount of rust occurring (area fraction being 0.10% or less)
4: Area fraction of rust occurring=more than 0.10% to 0.50% or less
3: Area fraction of rust occurring=more than 0.50% to 2.5% or less
2: Area fraction of rust occurring=more than 2.5% to 10% or less
1: Area fraction of rust occurring=more than 10% to 50% or less For appearance, a sample that was shiny, smooth, and uniform was given a grade 5, a sample that was shiny but slightly poor in uniformity was given a grade 4, a sample that was a little shiny and was smooth but poor in uniformity was given a grade 3, a sample that was little shine and slightly poor in smoothness and poor in uniformity was given a grade 2, and a sample that was poor in shine, uniformity, and smoothness was given a grade 1. Samples given a grade of 3 or more for appearance were rated as good.

For each sample, the thickness of its insulating coating film was measured with an electrical coating thickness tester, and a space factor (%) was calculated from measurement values of the insulating coating film on the surfaces of its base metal steel sheet and the sheet thickness of the base metal steel sheet (300 μm). The space factor in the present example can be calculated with a coating thickness $d_1$ (μm) of the insulating coating film illustrated in FIG. 1 as Space factor (%)={300 μm/(300 μm+2×$d_1$)}×100.

Obtained results are collectively shown in Table 5.

TABLE 5

| | | Evalution result | | | | | | | | |
|---|---|---|---|---|---|---|---|---|---|---|
| No. | Degree of crystallinity (%) | Adhesiveness | Insulation property | Heat resistance | Workability | Corrosion resistance | Hygroscopic resistance | Appearance | Space factor (%) | |
| 1 | 3.5 | B | A | A | A | 8 | 5 | 4 | 99.3 | Inventive example |
| 2 | 2.5 | B | A | B | B | 9 | 4 | 5 | 99.5 | Inventive example |
| 3 | 2.0 | B | A | B | A | 8 | 4 | 5 | 99.4 | Inventive example |
| 4 | 0.8 | A | B | B | A | 10 | 5 | 5 | 99.3 | Inventive example |
| 5 | 0.7 | A | B | A | A | 9 | 5 | 5 | 99.6 | Inventive example |
| 6 | 0.8 | A | B | B | A | 9 | 5 | 5 | 99.4 | Inventive example |
| 7 | 0.6 | A | B | B | A | 9 | 5 | 5 | 99.5 | Inventive example |
| 8 | 4.5 | B | A | A | B | 7 | 4 | 4 | 99.3 | Inventive example |
| 9 | 1.5 | A | A | B | B | 7 | 5 | 5 | 99.4 | Inventive example |
| 10 | 4.7 | B | A | B | B | 7 | 4 | 5 | 99.3 | Inventive example |
| 11 | 6.5 | C | A | A | B | 6 | 3 | 3 | 98.9 | Comparative example |
| 12 | 5.3 | B | B | B | C | 7 | 3 | 2 | 99.4 | Comparative example |
| 13 | 0.3 | B | C | B | C | 8 | 2 | 4 | 99.2 | Comparative example |
| 14 | 0.0 | A | B | C | A | 8 | 1 | 1 | 99.4 | Comparative example |
| 15 | 0.0 | A | C | C | A | 7 | 1 | 3 | 99.4 | Comparative example |
| 16 | 0.3 | A | C | C | A | 8 | 2 | 4 | 99.4 | Comparative example |
| 17 | 6.0 | C | A | A | C | 6 | 4 | 4 | 98.8 | Comparative example |
| 18 | 0.2 | A | B | C | C | 3 | 2 | 1 | 98.9 | Comparative example |
| 19 | 5.8 | C | A | A | C | 6 | 4 | 4 | 99.0 | Comparative example |
| 20 | 0.3 | A | A | C | B | 8 | 2 | 3 | 99.2 | Comparative example |
| 21 | 0.0 | C | B | C | B | 7 | 1 | 3 | 99.2 | Comparative example |
| 22 | 0 0 | B | B | C | B | 7 | 1 | 2 | 99.3 | Comparative example |
| 23 | 0.0 | A | B | C | C | 6 | 1 | 4 | 99.4 | Comparative example |
| 24 | 0.0 | A | A | C | A | 9 | 1 | 5 | 99.2 | Comparative example |
| 25 | 6.3 | C | C | B | C | 4 | 3 | 4 | 98.8 | Comparative example |
| 26 | 7.4 | C | A | B | C | 6 | 4 | 4 | 98.8 | Comparative example |
| 27 | 0.3 | A | A | C | B | 7 | 2 | 2 | 99.3 | Comparative example |
| 28 | 5.5 | B | A | A | C | 8 | 3 | 4 | 98.9 | Comparative example |
| 29 | 21.6 | C | B | A | C | 5 | 4 | 4 | 98.3 | Comparative example |
| 30 | 6.2 | C | A | B | C | 6 | 5 | 4 | 98.7 | Comparative example |
| 31 | 14.6 | C | B | A | C | 6 | 4 | 4 | 98.5 | Comparative example |
| 32 | 6.7 | C | A | B | C | 5 | 4 | 4 | 98.9 | Comparative example |

As is clear from Table 5, samples in example embodiments of the present invention satisfying the specifications according to the present invention did not contain chromate and exhibited much more excellent properties in insulation property, workability, adhesiveness, hygroscopic resistance, corrosion resistance, and heat resistance. In contrast, samples in comparative examples falling out of any one of the specifications according to the present invention did not provide properties combining insulation property, workability, adhesiveness, hygroscopic resistance, corrosion resistance, and heat resistance.

REFERENCE SIGNS LIST 1. non-oriented electrical steel sheet
11. base metal steel sheet
13. insulating coating film

The invention claimed is:
1. A non-oriented electrical steel sheet comprising
a base metal steel sheet and an insulating coating film that is formed on a surface of the base metal steel sheet, wherein
the insulating coating film contains metal phosphate, organic resin, and water-soluble organic compound at 50 mass % or more in total with respect to a total mass of the insulating coating film,
the metal phosphate contains at least aluminum as a metallic element,
the organic resin has an SP value that is within a range of 18.0 $(MPa)^{0.5}$ or more to less than 24.0 $(MPa)^{0.5}$,
the water-soluble organic compound has an SP value that is within a range of 19.0 $(MPa)^{0.5}$ or more to less than 35.0 $(MPa)^{0.5}$,
wherein the SP value represents a Hildebrand solubility parameter which is measured by a cloud method, and
when measurement by X-ray diffractometry is performed on the insulating coating film, a degree of crystallinity of aluminum phosphate calculated from a peak from the metal phosphate is within a range of 0.5 to 5.0%.
2. The non-oriented electrical steel sheet according to claim 1, wherein the metal phosphate further contains a divalent metallic element M other than aluminum as a metallic element.
3. The non-oriented electrical steel sheet according to claim 2, wherein the metallic element M is one or more types selected from the group of Zn, Co, Mg, Mn, and Ni.
4. The non-oriented electrical steel sheet according to claim 1, wherein a content of the organic resin is, per 100 parts by weight of the metal phosphate, 3 parts by weight or more to 50 parts by weight or less.
5. The non-oriented electrical steel sheet according to claim 2, wherein a content of the organic resin is, per 100 parts by weight of the metal phosphate, 3 parts by weight or more to 50 parts by weight or less.

6. The non-oriented electrical steel sheet according to claim 3, wherein a content of the organic resin is, per 100 parts by weight of the metal phosphate, 3 parts by weight or more to 50 parts by weight or less.

* * * * *